United States Patent
Ober et al.

(10) Patent No.: US 10,027,755 B2
(45) Date of Patent: Jul. 17, 2018

(54) SELECTING STORAGE UNITS IN ONE OR MORE DISPERSED STORAGE NETWORKS

(71) Applicant: International Business Machines Corporation, Armonk, NY (US)

(72) Inventors: Brian F. Ober, Lake in the Hills, IL (US); Jason K. Resch, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 223 days.

(21) Appl. No.: 15/170,675

(22) Filed: Jun. 1, 2016

(65) Prior Publication Data

US 2017/0353552 A1   Dec. 7, 2017

(51) Int. Cl.
*G06F 15/16* (2006.01)
*H04L 29/08* (2006.01)
*G06F 17/30* (2006.01)

(52) U.S. Cl.
CPC .... *H04L 67/1097* (2013.01); *G06F 17/30197* (2013.01); *H04L 67/18* (2013.01)

(58) Field of Classification Search
CPC ................. H04L 67/1097; H04L 67/18; G06F 17/30197
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A | 1/1996 | Rabin | |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Jonathan A Bui
(74) *Attorney, Agent, or Firm* — Garlick & Markison; Timothy W. Markison; Patricia A. Markison

(57) ABSTRACT

A method includes identifying a data access issue between a computing device and a first set of storage units regarding a data object. The method further includes determining whether the computing device will have a lessened data access issue with a second set of storage units. The method further includes, when the computing device will have the lessened data access issue with the second set of storage units, sending a copy of a transfer number of encoded data slices for each set of a plurality of sets of encoded data slices from at least some of the storage units of the first set of storage units to at least some of the storage units of the second set of storage units. The method further includes establishing access for the computing device to access the second set of storage units regarding the data object.

15 Claims, 6 Drawing Sheets

(56) References Cited

U.S. PATENT DOCUMENTS

| | | |
|---|---|---|
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2011/0289122 A1* | 11/2011 | Grube ............... G06F 11/2094 707/812 |
| 2014/0244788 A1* | 8/2014 | Resch ............... H04L 67/1097 709/217 |
| 2016/0055060 A1* | 2/2016 | Resch ............... G06F 11/1044 714/764 |
| 2016/0154698 A1* | 6/2016 | Kazi ............... G06F 11/1092 714/766 |
| 2016/0179618 A1* | 6/2016 | Resch ............... H04L 63/101 714/764 |
| 2016/0321136 A1* | 11/2016 | Baptist ............... G06F 3/0619 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner distributed computing system 10

SELECTING STORAGE UNITS IN ONE OR MORE DISPERSED STORAGE NETWORKS

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

Aspects of this invention relate generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

DETAILED DESCRIPTION OF THE INVENTION

Figure 1:
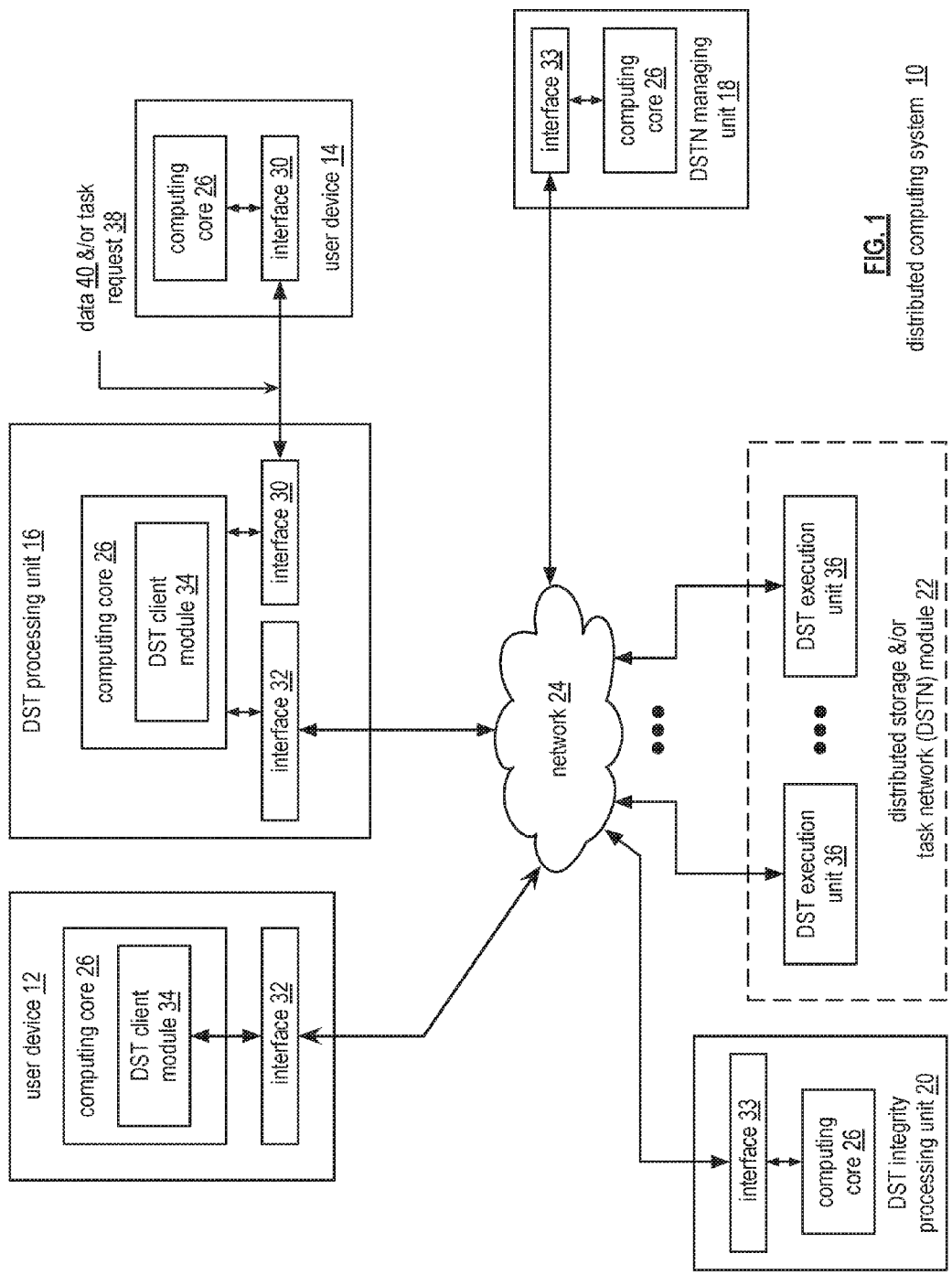
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more non-public intranet systems and/or public internet systems; and/or one or more local area networks (LAN) and/or wide area networks (WAN). Hereafter, the distributed computing system 10 may be interchangeably referred to as a dispersed storage network (DSN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, the DST execution unit may be interchangeably referred to as a storage unit and a set of DST execution units may be interchangeably referred to as a set of storage units.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general, and with respect to DS error encoded data storage and retrieval, the distributed computing system 10 supports three primary operations: storage management, data storage and retrieval, and data storage integrity verification. In accordance with these three primary functions, data can be encoded (e.g., utilizing an information dispersal algorithm (IDA), utilizing a dispersed storage error encoding process), distributedly stored in physically different locations, and subsequently retrieved in a reliable and secure manner. Hereafter, distributedly stored may be interchangeably referred to as dispersed stored. Such a system is tolerant of a significant number of failures (e.g., up to a failure level, which may be greater than or equal to a pillar width (e.g., an IDA width of the IDA) minus a decode threshold minus one) that may result from individual storage device (e.g., DST execution unit 36) failures and/or network equipment failures without loss of data and without the need for a redundant or backup copy. Further, the distributed computing system 10 allows the data to be stored for an indefinite period of time without data loss and does so in a secure manner (e.g., the system is very resistant to unauthorized attempts at accessing the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block associated with a portion of an overall namespace of the DSN) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated system registry information in one or more of the DSTN module 22, the user device 12, the DST processing unit 16, and the DST integrity processing unit 20.

The DS error encoding parameters (e.g., or dispersed storage error coding parameters for encoding and decoding) include data segmenting information (e.g., how many segments data (e.g., a file, a group of files, a data block, etc.) is divided into), segment security information (e.g., per segment encryption, compression, integrity checksum, etc.), error coding information (e.g., pillar/IDA width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a non-public vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

Each slice name is unique to a corresponding encoded data slice and includes multiple fields associated with the overall namespace of the DSN. For example, the fields may include a pillar number/pillar index, a vault identifier, an object number uniquely associated with a particular file for storage, and a data segment identifier of a plurality of data segments, where the particular file is divided into the plurality of data segments. For example, each slice name of a set of slice names corresponding to a set of encoded data slices that has been dispersed storage error encoded from a common data segment varies only by entries of the pillar number field as each share a common vault identifier, a common object number, and a common data segment identifier.

To support distributed task processing on received data, the distributed computing system 10 has two primary operations: DST (distributed storage and/or task processing) management and DST execution on received data. With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. With respect to the DST management, it is substantially similar to the DST management to support distributed task processing on received data.

Figure 2:
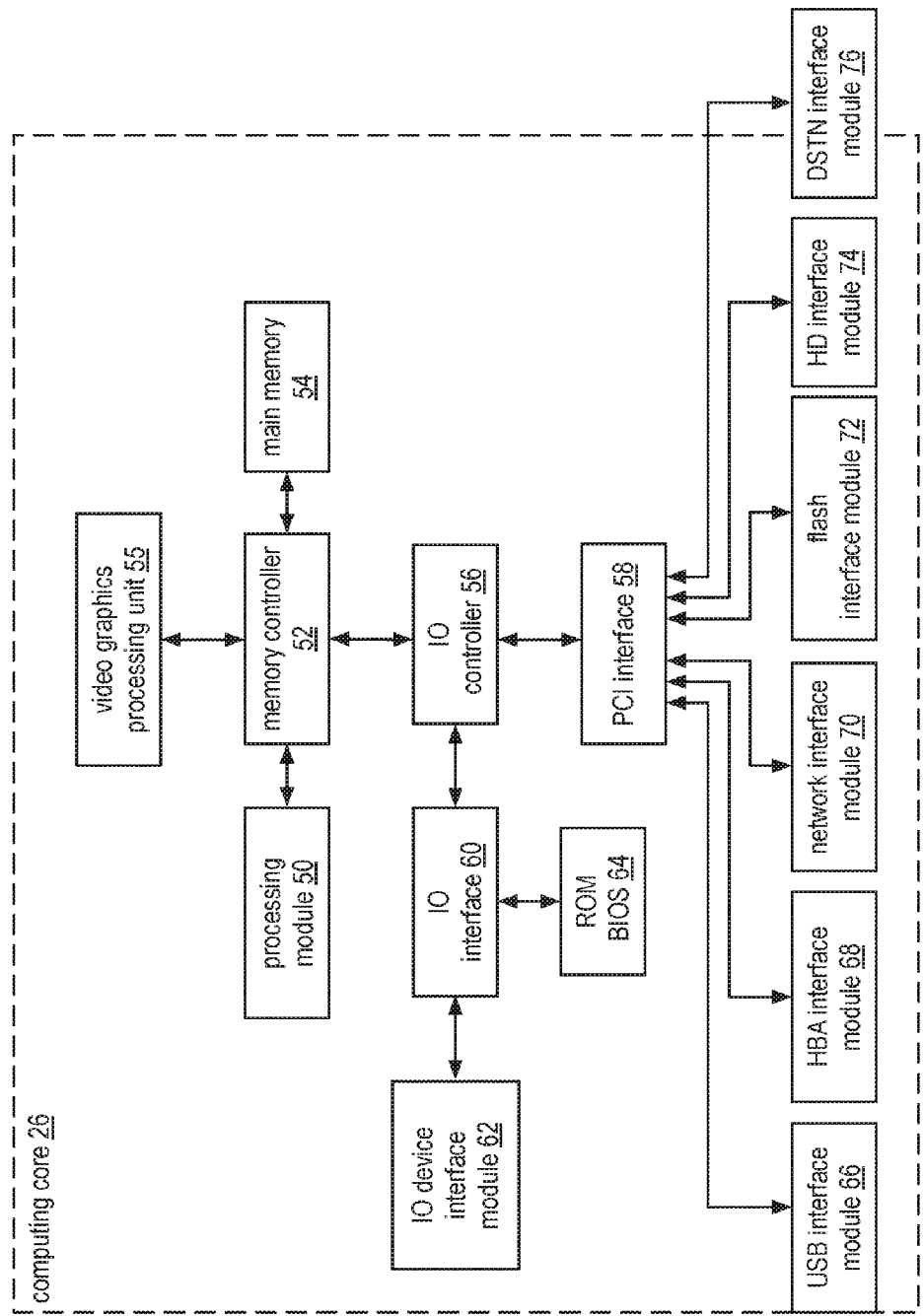
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
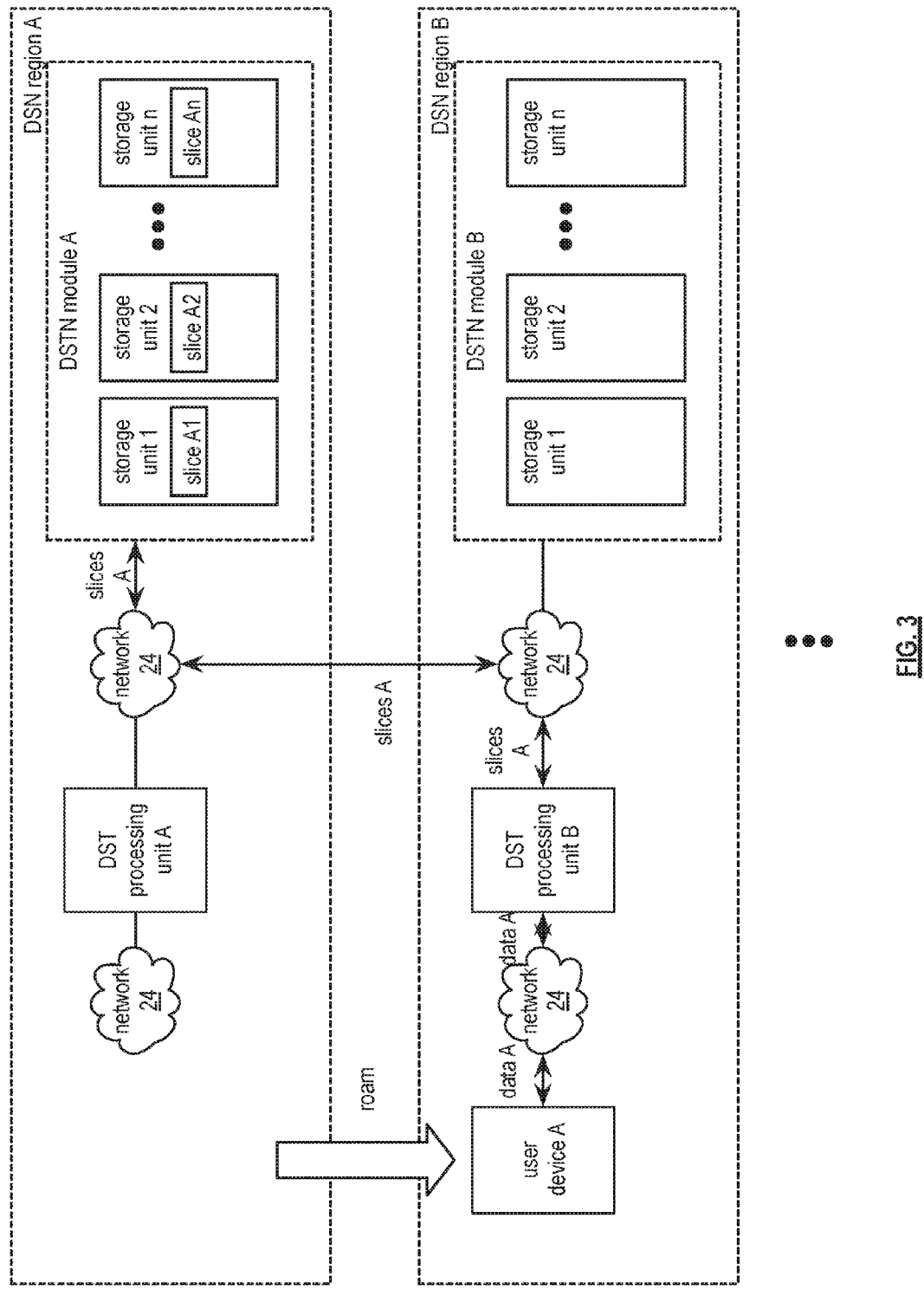
FIGS. 3-5 are schematic block diagrams of an embodiment of a plurality of a dispersed storage networks in accordance with the present invention.
Figure 4:
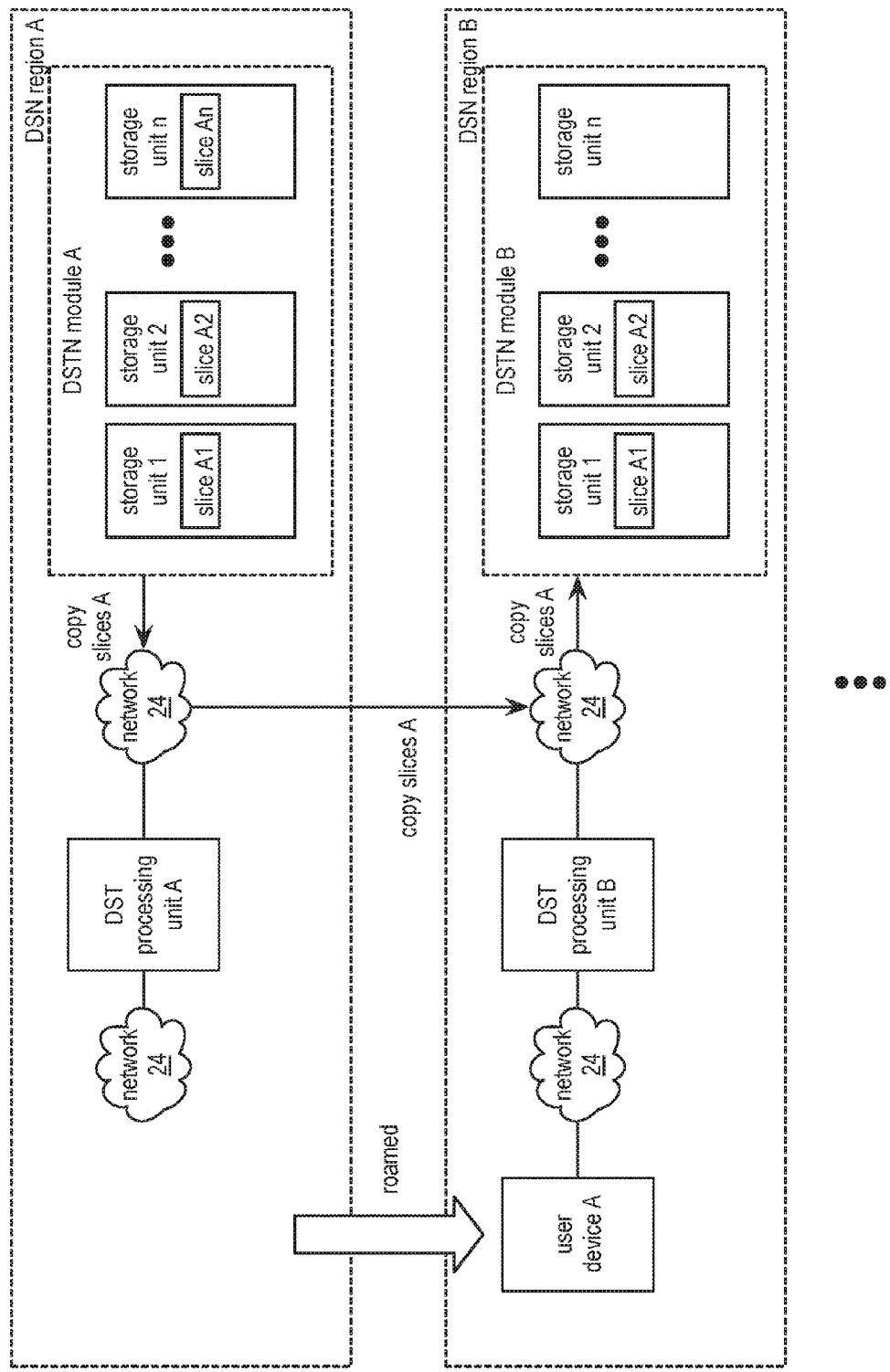
Figure 5:
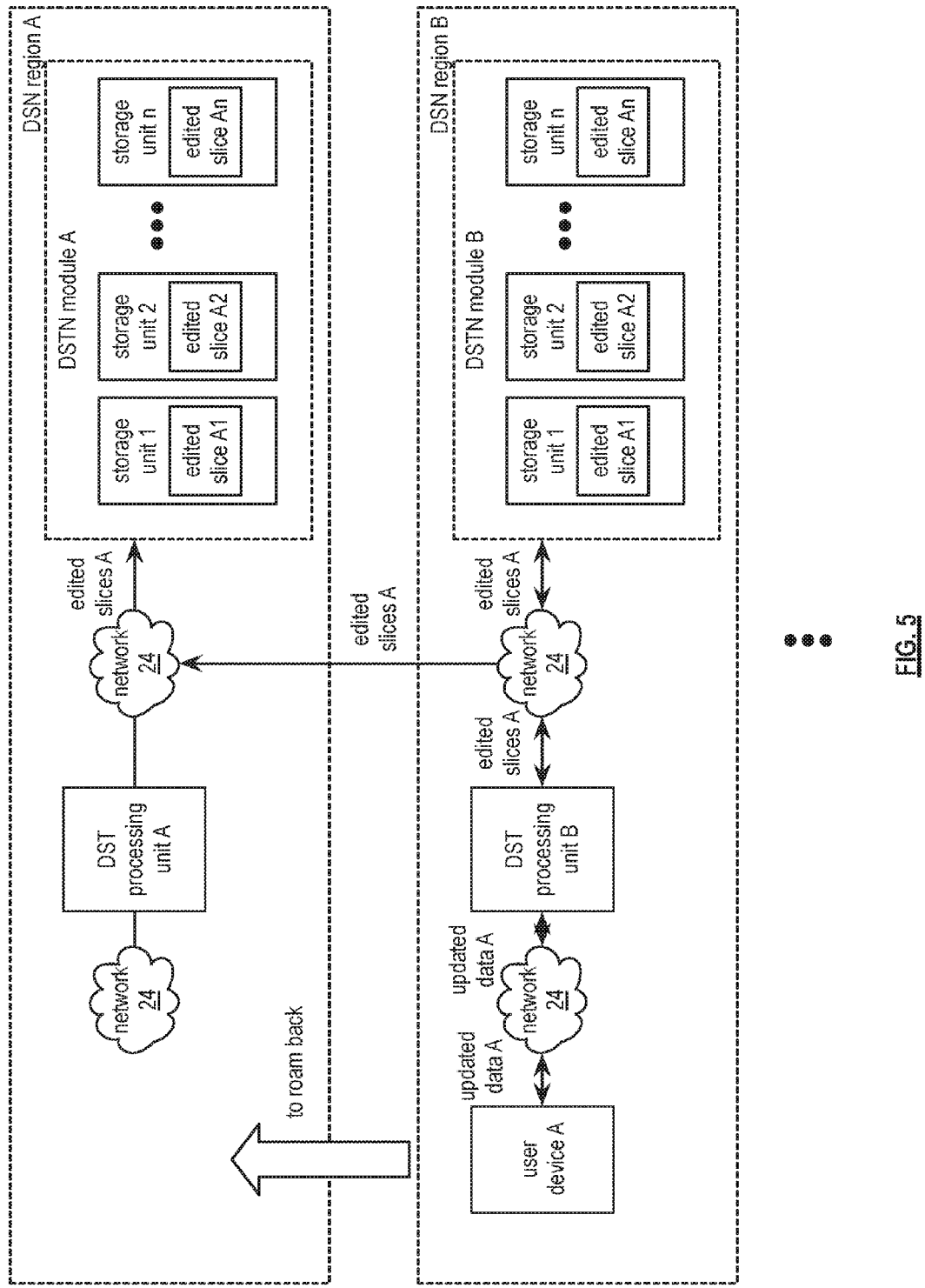

FIGS. 3-5 are schematic block diagrams of an embodiment of a plurality of dispersed storage networks (DSNs). Each DSN is implemented as discussed with reference to FIG. 1 and covers a geographic region (e.g., a city block, a town, a country, a state, a portion thereof, and/or a combination thereof). In FIGS. 3-5, two DSNs are shown: DSN A and DSN B. DSN A covers a geographic first region (DSN region A) and DSN B covers a second geographic region (DSN region B). The user device A may be implemented utilizing one of the user device 14 of FIG. 1 and the user device 12 of FIG. 1 and may roam between the DSNs (e.g., from A to B, or from B to A) or between other DSNs. Typically, the user device A is affiliated with DSN A due to a geographic proximity of user device A to DSN A (e.g., the user of user device A lives in the geographic region of DSN A), which provides minimal latency issues for user device A when access the storage units of DSN A.

From time to time, user device A roams to other geographic areas that are better served (e.g., lower latency, higher data throughput, reduced down time, and/or other performance and/or reliability factors) from anther DSN than DSN A. Accordingly, the DSNs have an agreement to enable user devices from one DSN to roam and received data access services from another DSN. Note that user device A and one or more of the DST processing units may be referred to as a computing device and that each storage unit may be implemented utilizing a DST execution unit 36 of FIG. 1.

In FIG. 3, user device A (e.g., a computing device) roams into the geographic coverage area of DSN B while still receiving data access services from DSN A. While receiving data access services from DSN A (e.g., reading or writing data from or to the storage units of DSN A), the user device A experiences a data access issue. The data access issue includes a current and/or a potential future access latency issue (e.g., access speeds and/or data throughput is/are lower than desired) and/or a access bandwidth capacity level issue (e.g., too few access requests processed in a desired amount of time). The user device A, the DST processing A, the DST processing unit B, the DSTN managing unit 18 of FIG. 1, and/or a storage unit may identify the data access issue. The first set of storage units (e.g., storage units 1-$n$ of the DSTN module A) is associated with a first DSN (e.g., the DSN region A) and a second set of storage units (e.g., storage units 1-$n$ of the DSTN module B) is associated with a second DSN (e.g., the DSN region B), where the first and second DSNs have a cooperative relationship regarding data access (e.g., to facilitate abatement of the data access issue, where the cooperative relationship includes providing a selection of the first or second storage units to access the data object).

As an example of identifying the data access issue, the user device A identifies a potential future access latency issue between the user device A and the DSTN module A when the user device A will and/or has moved from the DSN region A to the DSN region B and utilizes one or more resources of the DSN region B (e.g., the DST processing unit B, the network 24) to access the storage units 1-$n$ of the DSTN module A to gain access to the data object A. As another example, the DST processing unit B identifies the data access issue when detecting that the user device A has and/or will move from the DSN region A to the DSN region B. The identifying may further include identifying, by a first processing module of the first DSN of the plurality of DSNs, the data access issue, wherein the first set of storage units is affiliated with the first DSN. As an example, the DST processing unit A identifies the data access issue when detecting that the user device A has and/or will move from the DSN region A to the DSN region B.

The identifying of the data access issue may further include receiving a request by the computing device to access the data object via a second set of storage units (e.g., the storage units 1-n of the DSTN module B). For example, the DST processing unit B receives a data A request from the user device A to access the encoded data slices A1-An of the data object A utilizing the storage units 1-n of the DSTN module B and indicates that the data access issue has been identified.

Having identified the data access issue, a determination is made whether the computing device will have a lessened data access issue with the second set of storage units. The determining whether the computing device will have the lessened data access issue may be executed by at least one of the first processing module and a second processing module of the second DSN of the plurality of DSNs, where the second set of storage units (e.g., the storage units 1-n of the DSTN module B) is affiliated with the second DSN (e.g., of the DSN region B). The determining may further be executed by one or more of the user device A, the DST processing A, the DST processing unit B, the DSTN managing unit 18 of FIG. 1, and a storage unit of at least one of the DSN regions. The determining the lessened data access issue may include one or more of a variety of determining approaches. A first determining approach includes receiving the request by the computing device to access the data object via the second set of storage units. For example, the user device A determines that utilization of the second set of storage units will have the lessened data access issue, the user device A sends the data A request to the DST processing unit B to access the encoded data slices A1-An of the data object A utilizing the storage units 1-n of the DSTN module B, and the DST processing unit B indicates that the data access issue has been identified.

A second determining approach to determine whether the computing device will have the lessened data access issue with the second set of storage units includes determining a geographic location of the computing device and when the geographic location of the computing device is significantly closer to the second set of storage units than to the first set of storage units (e.g., inferring that a measurable difference in data access performance exists to provide reduced latency when utilizing the second set of storage units), determining that the computing device will have the lessened data access issue with the second set of storage units. For example, the DST processing unit B determines that the user device A is within the DSN region B and indicates that the user device A will have the lessened data access issue with the storage units 1-n of the DSTN module B.

A third determining approach to determine whether the computing device will have the lessened data access issue with the second set of storage units includes receiving the data access request from the computing device, determining a first processing cycle time with respect to the first set of storage units, determining a second processing cycle time with respect to the second set of storage units, and when the second process cycle time is at least a cycle time threshold less than the first processing cycle time, determining that the computing device will have the lessened data access issue with the second set of storage units. For example, the DST processing unit B receives the data access request A from the user device A, determines (e.g., performs a ping test) an access latency time, via the network 24, to the DSTN module A, determines an access latency time via the network 24 to the DSTN module B, and when the difference in access times is greater than the cycle time threshold, determines that the user device A will have the lessened data access issue with the storage units 1-n of the DSTN module B.

A fourth determining approach to determine whether the computing device will have the lessened data access issue with the second set of storage units includes receiving a request message that the computing device is, or will be, roaming to a geographic region primarily supported by the second set of storage units and access to the second set of storage units is requested for the computing device. The request may be sourced from a variety of sources including the computing device making the request, the request is automatically generated by either of the DST processing units A and B on behalf of the computing device, and the request is made by at least one of the user device A, the DST processing unit A, and the DST processing unit B when the computing device is in the geographic region (e.g., a DSN region B), or in anticipation of the computing device being the geographic region (e.g., detection or notification of roaming from the DSN region A to the DSN region B.

FIG. 4 further illustrates the example of operation of the selecting of the storage units where, when the computing device will have the lessened data access issue with the second set of storage units, a copy is sent of a transfer number of encoded data slices for each set of a plurality of sets of encoded data slices from at least some of the storage units of the first set of storage units to at least some of the storage units of the second set of storage units, and where the transfer number is equal or greater than the decode threshold number and less than the total number of encoded data slices in the set of encoded data slices. For example, a decode threshold number of storage units of the DSTN module A detect the lessened data access issue with a corresponding decode threshold number of storage units of the DSTN module B and send, via the network 24, a corresponding decode threshold number of encoded data slices of each of the plurality of sets of encoded data slices of the data object A to the corresponding decode threshold number of storage units of the DSTN module B.

The sending of the copy of the transfer number of encoded data slices may further include, when the computing device will have the lessened data access issue with the second set of storage units, the second processing module issuing a request for the sending of the copy of the transfer number of encoded data slices for each set of the plurality of sets of encoded data slices from at least some of the storage units of the first set of storage units. For example, the DST processing unit B issues the request for sending the copy of the transfer number of encoded data slices to the decode threshold number of storage units of the DSTN module A to facilitate the sending, via the network 24 by the decode threshold number of storage units of the DSTN module A, a copy of the decode threshold number of encoded data slices of each set of encoded data slices of the plurality of sets of encoded data slices of the data object A from the decode threshold number of the storage units of the DSTN module A to a corresponding decode threshold number of the storage units of the DSTN module B.

Having sent the copy of the transfer number of encoded data slices, accesses established for the computing device to access the second set of storage units regarding the data object. The establishing includes the second processing module establishing the access for the computing device to access the second set of storage units regarding the data object. For example, the DST processing unit B grants access permissions to the user device A to establish the access for the user device A to access the storage units 1-$n$ of the DSTN module B to access the data object A.

FIG. 5 further illustrates the example of operation of the selecting of the storage units where a data access request of the computing device for the data object is processed via the second set of storage units. For example, the user device A issues, via the network 24, a data access request A to the DST processing unit B, the DST processing unit B accesses, via the network 24, the sets of encoded data slices to the of the storage units 1-$n$ of the DSTN module B. When the data access request is a write request, the DST processing unit B and stores an edited plurality of sets of encoded data slices of the data object within the second set of storage units, where each set of the edited plurality of sets includes the total number of encoded data slices. For example, the DST processing unit B dispersed storage error encodes an updated data object A to produce the edited plurality of sets of encoded data slices, and stores, via the network 24, the edited plurality of sets of encoded data slices in the storage units 1-$n$ of the DSTN module B.

When the computing device will have the lessened data access issue with the first set of storage units with respect to the second set of storage units, the edited plurality of sets of encoded data slices are transferred from the second set of storage units to the first set of storage units. For example, the DST processing unit B detects that the user device A is moving to the DSN region A, determines that the user device A will have the lessened data access issue with the storage units of the DSTN module A with respect to the storage units of the DSTN module B, and facilitates transfer, via the network 24, of the edited plurality of sets of encoded data slices from the storage units of the DSTN module B to the storage units of the DSTN module A.

Figure 6:
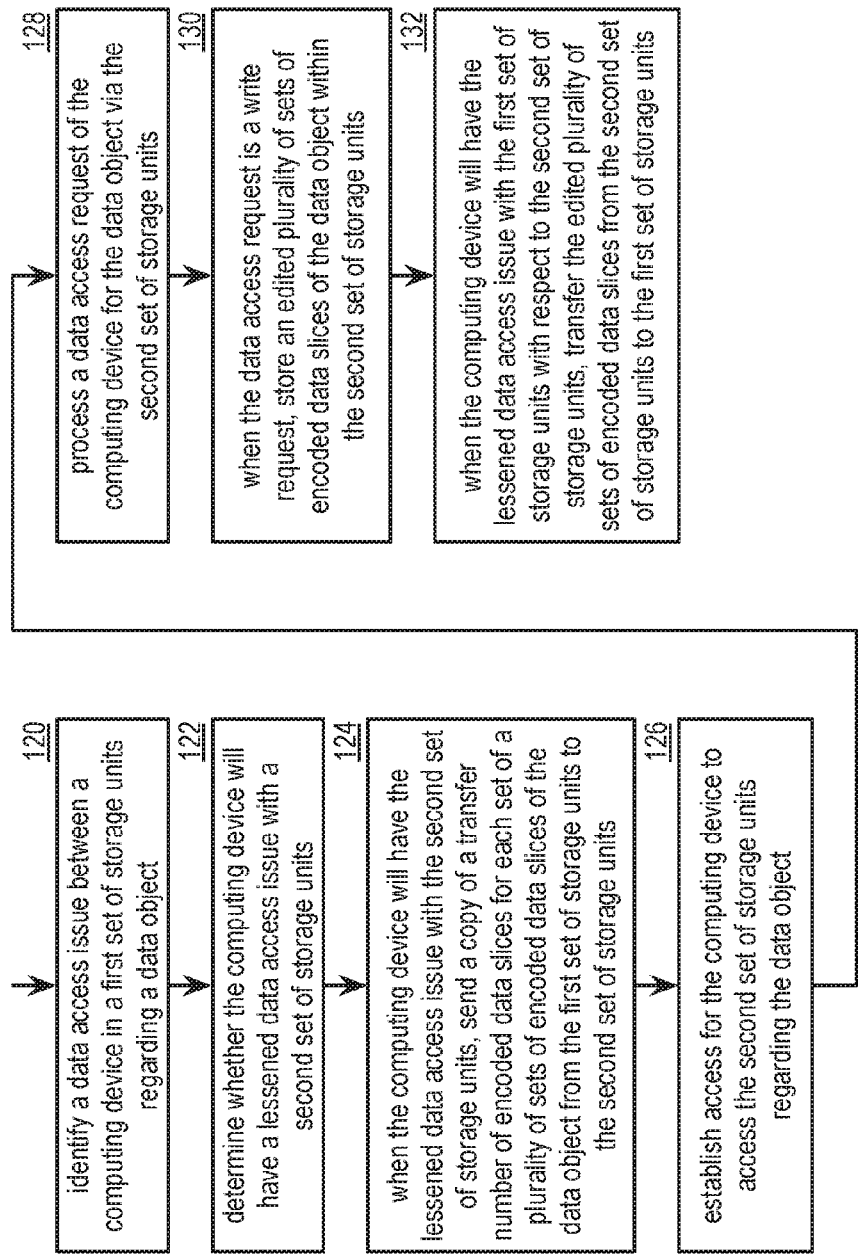
FIG. 6 is a flowchart illustrating an example of selecting storage units in accordance with the present invention.

FIG. 6 is a flowchart illustrating an example of selecting storage units. In particular, a method is presented for use in conjunction with one or more functions and features described in conjunction with FIGS. 1-2, 3-5, and also FIG. 6. The method includes step 120 where a processing module of a computing device of one or more computing devices of one or more dispersed storage networks (DSN) of a plurality of DSNs identifies a data access issue between a computing device and a first set of storage units regarding a data object. The identifying includes receiving a request by the computing device to access the data object via a second set of storage units. Alternatively, a first processing module of a first DSN of the plurality of DSNs identifies the data access issue, wherein the first set of storage units is affiliated with the first DSN.

The method continues at step 122 where the processing module determines whether the computing device will have a lessened data access issue with the second set of storage units. The first set of storage units is associated with a first DSN and the second set of storage units is associated with a second DSN, where the first and second DSNs have a cooperative relationship regarding data access. The determining the lessened data access issue includes receiving the request by the computing device to access the data object via the second set of storage units. The determining whether the computing device will have the lessened data access issue with the second set of storage units includes determining a geographic location of the computing device, and when the geographic location of the computing device is significantly closer to the second set of storage units than to the first set of storage units, determining that the computing device will have the lessened data access issue with the second set of storage units.

The determining whether the computing device will have the lessened data access issue with the second set of storage units further includes receiving a data access request from the computing device, determining a first processing cycle time with respect to the first set of storage units, determining a second processing cycle time with respect to the second set of storage units, and when the second process cycle time is at least a cycle time threshold less than the first processing cycle time, determining that the computing device will have the lessened data access issue with the second set of storage units.

The determining whether the computing device will have the lessened data access issue with the second set of storage units further includes receiving a request message that the computing device is, or will be, roaming to a geographic region primarily supported by the second set of storage units and access to the second set of storage units is requested for the computing device. The determining whether the computing device will have the lessened data access issue with the second set of storage units further includes determining, by at least one of the first processing module and a second processing module of a second DSN of the plurality of DSNs, whether the computing device will have the lessened data access issue, where the second set of storage units is affiliated with the second DSN.

When the computing device will have the lessened data access issue with the second set of storage units, the method continues at step 124 where the processing module sends a copy of a transfer number of encoded data slices for each set of a plurality of sets of encoded data slices from at least some of the storage units of the first set of storage units to at least some of the storage units of the second set of storage units, where the data object is divided into a plurality of data segments, where a data segment of the plurality of data segments is dispersed storage error encoded into a set of encoded data slices, where a decode threshold number of encoded data slices of the set of encoded data slices is needed to recover the data segment, and where the transfer number is equal or greater than the decode threshold number and less than a total number of encoded data slices in the set of encoded data slices. Alternatively, when the computing device will have the lessened data access issue with the second set of storage units, the second processing module issues a request for the sending of the copy of the transfer number of encoded data slices for each set of the plurality of sets of encoded data slices from at least some of the storage units of the first set of storage units.

The method continues at step 126 where the processing module establishes access (e.g., enables permissions) for the computing device to access the second set of storage units regarding the data object. Alternatively the second processing module establishes the access for the computing device to access the second set of storage units regarding the data object. The method continues at step 128 where the processing module processes a data access request of the computing device for the data object via the second set of storage units. When the data access request is a write request, the method continues at step 130 where the processing module stores an edited plurality of sets of encoded data slices of the data object within the second set of storage units, where each set of the edited plurality of sets includes the total number of encoded data slices. When the computing device will have the lessened data access issue with the first set of storage units with respect to the second set of storage units, the method continues at step 132 where the processing module transfers the edited plurality of sets of encoded data slices from the second set of storage units to the first set of storage units.

The method described above in conjunction with the processing module can alternatively be performed by other modules of the dispersed storage network or by other devices. For example, any combination of a first module, a second module, a third module, a fourth module, etc. of the computing device may perform the method described above. In addition, at least one memory component (e.g., a first memory component, a second memory component, a third memory component, a fourth memory component, a fifth memory component, a sixth memory component, etc. of a non-transitory computer readable storage medium, i.e., a computer readable memory device) that stores operational instructions can, when executed by one or more processing modules of one or more computing devices of the dispersed storage network (DSN), cause the one or more computing devices to perform any or all of the method steps described above.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by one or more processing modules of one or more dispersed storage networks (DSN) of a plurality of DSNs, the method comprises:
   identifying a data access issue between a computing device and a first set of storage units regarding a data object;
   determining whether the computing device will have a lessened data access issue with a second set of storage units;
   when the computing device will have the lessened data access issue with the second set of storage units, sending a copy of a transfer number of encoded data slices for each set of a plurality of sets of encoded data slices from at least some of the storage units of the first set of storage units to at least some of the storage units of the second set of storage units, wherein the data object is divided into a plurality of data segments, wherein a data segment of the plurality of data segments is dispersed storage error encoded into a set of encoded data slices, wherein a decode threshold number of encoded data slices of the set of encoded data slices is needed to recover the data segment, and wherein the transfer number is equal or greater than the decode threshold number and less than a total number of encoded data slices in the set of encoded data slices; and
   establishing access for the computing device to access the second set of storage units regarding the data object.

2. The method of claim 1 further comprises:
   the first set of storage units is associated with a first DSN; and
   the second set of storage units is associated with a second DSN, wherein the first and second DSNs have a cooperative relationship regarding data access.

3. The method of claim 1, wherein the determining whether the computing device will have the lessened data access issue with the second set of storage units comprises:
   determining a geographic location of the computing device; and
   when the geographic location of the computing device is significantly closer to the second set of storage units than to the first set of storage units, determining that the computing device will have the lessened data access issue with the second set of storage units.

4. The method of claim 1, wherein the determining whether the computing device will have the lessened data access issue with the second set of storage units comprises:
   receiving a data access request from the computing device;
   determining a first processing cycle time with respect to the first set of storage units;
   determining a second processing cycle time with respect to the second set of storage units; and
   when the second process cycle time is at least a cycle time threshold less than the first processing cycle time, determining that the computing device will have the lessened data access issue with the second set of storage units.

5. The method of claim 1, wherein the determining whether the computing device will have the lessened data access issue with the second set of storage units comprises:
   receiving a request message that the computing device is, or will be, roaming to a geographic region primarily supported by the second set of storage units and access to the second set of storage units is requested for the computing device.

6. The method of claim 1 further comprises:
   identifying, by a first processing module of a first DSN of the plurality of DSNs, the data access issue, wherein the first set of storage units is affiliated with the first DSN;
   determining, by at least one of the first processing module and a second processing module of a second DSN of the plurality of DSNs, whether the computing device will have the lessened data access issue, wherein the second set of storage units is affiliated with the second DSN;
   when the computing device will have the lessened data access issue with the second set of storage units, issuing a request, by the second processing module, for the sending of the copy of the transfer number of encoded data slices for each set of the plurality of sets of encoded data slices from at least some of the storage units of the first set of storage units; and
   establishing, by the second processing module, the access for the computing device to access the second set of storage units regarding the data object.

7. The method of claim 1, wherein the identifying the data access issue and the determining the lessened data access issue comprises:
  receiving a request by the computing device to access the data object via the second set of storage units.

8. The method of claim 1 further comprises:
  processing a data access request of the computing device for the data object via the second set of storage units;
  when the data access request is a write request, storing an edited plurality of sets of encoded data slices of the data object within the second set of storage units, wherein each set of the edited plurality of sets includes the total number of encoded data slices; and
  when the computing device will have the lessened data access issue with the first set of storage units with respect to the second set of storage units, transferring the edited plurality of sets of encoded data slices from the second set of storage units to the first set of storage units.

9. A computer readable memory device comprises:
  a first memory component that stores operational instructions that, when executed by one or more processing modules of one or more dispersed storage networks (DSN) of a plurality of DSNs, causes the one or more processing modules to:
    identify a data access issue between a computing device and a first set of storage units regarding a data object; and
    determine whether the computing device will have a lessened data access issue with a second set of storage units;
  a second memory component that stores operational instructions that, when executed by the one or more processing modules, causes the one or more processing modules to:
    when the computing device will have the lessened data access issue with the second set of storage units, send a copy of a transfer number of encoded data slices for each set of a plurality of sets of encoded data slices from at least some of the storage units of the first set of storage units to at least some of the storage units of the second set of storage units, wherein the data object is divided into a plurality of data segments, wherein a data segment of the plurality of data segments is dispersed storage error encoded into a set of encoded data slices, wherein a decode threshold number of encoded data slices of the set of encoded data slices is needed to recover the data segment, and wherein the transfer number is equal or greater than the decode threshold number and less than a total number of encoded data slices in the set of encoded data slices; and
  a third memory component that stores operational instructions that, when executed by the one or more processing modules, causes the one or more processing modules to:
    establish access for the computing device to access the second set of storage units regarding the data object.

10. The computer readable memory device of claim 9 further comprises:
  the first set of storage units is associated with a first DSN; and
  the second set of storage units is associated with a second DSN, wherein the first and second DSNs have a cooperative relationship regarding data access.

11. The computer readable memory device of claim 9, wherein the first memory component further stores operational instructions that, when executed by the one or more processing modules, causes the one or more processing modules to determine whether the computing device will have the lessened data access issue with the second set of storage units by:
  determining a geographic location of the computing device; and
  when the geographic location of the computing device is significantly closer to the second set of storage units than to the first set of storage units, determining that the computing device will have the lessened data access issue with the second set of storage units.

12. The computer readable memory device of claim 9, wherein the first memory component further stores operational instructions that, when executed by the one or more processing modules, causes the one or more processing modules to determine whether the computing device will have the lessened data access issue with the second set of storage units by:
  receiving a data access request from the computing device;
  determining a first processing cycle time with respect to the first set of storage units;
  determining a second processing cycle time with respect to the second set of storage units; and
  when the second process cycle time is at least a cycle time threshold less than the first processing cycle time, determining that the computing device will have the lessened data access issue with the second set of storage units.

13. The computer readable memory device of claim 9, wherein the first memory component further stores operational instructions that, when executed by the one or more processing modules, causes the one or more processing modules to determine whether the computing device will have the lessened data access issue with the second set of storage units by:
  receiving a request message that the computing device is, or will be, roaming to a geographic region primarily supported by the second set of storage units and access to the second set of storage units is requested for the computing device.

14. The computer readable memory device of claim 9, wherein the first memory component further stores operational instructions that, when executed by the one or more processing modules, causes the one or more processing modules to identify the data access issue and to determine the lessened data access issue by:
  receiving a request by the computing device to access the data object via the second set of storage units.

15. The computer readable memory device of claim 9 further comprises:
  a third memory component that stores operational instructions that, when executed by the one or more processing modules, causes the one or more processing modules to:
    process a data access request of the computing device for the data object via the second set of storage units;
    when the data access request is a write request, store an edited plurality of sets of encoded data slices of the data object within the second set of storage units, wherein each set of the edited plurality of sets includes the total number of encoded data slices; and
    when the computing device will have the lessened data access issue with the first set of storage units than with respect to the second set of storage units, transfer the edited plurality of sets of encoded data slices from the second set of storage units to the first set of storage units.

\* \* \* \* \*